United States Patent Office 3,547,990
Patented Dec. 15, 1970

3,547,990
LITHIUM SALTS OF BUTYRIC
ACID DERIVATIVES
Irvin M. Gerson, 402 Waring Road, Elkins Park, Pa.
19117, and Harry J. Prebluda, Trenton, N.J.; said
Prebluda assignor to said Gerson
No Drawing. Filed Jan. 27, 1967, Ser. No. 612,104
Int. Cl. C07c 101/04
U.S. Cl. 260—534      3 Claims

ABSTRACT OF THE DISCLOSURE

The following butyric acid derivatives and methods for their preparation are disclosed:

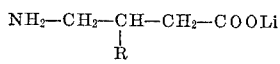

wherein R is either H or OH.

The compounds are useful in the elimination of psychotic effects in laboratory animals.

BACKGROUND OF THE INVENTION

Field of the invention

The invention pertains to salts of acyclic amino butyric acid derivatives. More particularly, it pertains to the lithium salts of (a) gamma-amino butyric acid (henceforth herein GABA) and (b) gamma-amino beta-hydroxy butyric acid (henceforth herein GABOB).

Description of the prior art

The amino carboxylic acids referred to above (i.e. GABA and GABOB) are known in the prior art and are commercially available in dosage form for human therapeutic purposes, These materials are sedatives for the cerebrum and nerves. They find application in the control of epilepsy and other anti-seizure applications.

Lithium salts have been used, to a limited extent, for the treatment of manic psychosis. Available data has been reviewed in "Diseases of the Nervous System," volume 27, February 1966, pages 122–126. Because of the toxic effect in humans when the lithium serum level is more than two milliequivalents per liter, constant clinical appraisal of patients is necessary. Even when the least toxic salt (i.e., the carbonate) is used, a constant threat of toxicity is present. This is the inexorable product of the fact that current lithium therapy involves saturation of body tissue with lithium even though the intended area of treatment is the brain.

SUMMARY OF THE INVENTION

The invention comprises lithium salts of GABA and GABOB having the formula:

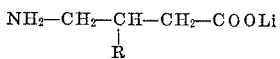

wherein R is selected from the group comprising H and OH. These salts may be prepared by neutralization of the appropriate acid with a basic lithium compound, preferably, a hydroxide.

Such salts have been found to possess utility in the treatment of laboratory animals suffering from psychoses analogous to mania in human beings. The organic portion of the molecule metabolizes selectively in the brain, thus enabling achievement of a high cranial lithium content without free lithium in the rest of the body reaching toxic levels associated with those lithium compounds previously used in therapy. It is postulated that because GABA and GABOB are metabolized only in the brain, they serve as "special carrier" portions of the total molecule and thus carry lithium to the brain.

Accordingly, it is an object of the invention to provide novel salts having the above formula.

An additional object of the invention is to provide salts which individually or admixed have therapeutic application in treatment of psychoses.

DESCRIPTION OF THE PREFERRED
EMBODIMENTS

Salts of the invention are best prepared by the reaction of a butyric acid derivative with a basic lithium compound such as, for example, lithium hydroxide or lithium carbonate. The hydroxide is preferred over the carbonate because of its faster reaction rate.

Mechanically it is preferable to conduct the reaction by the slow addition of solid butyric acid derivative (i.e., GABA or GABOB) to a stoichiometric quantity of a 14% aqueous solution of lithium hydroxide monohydrate. Such a procedure yields the compounds of the invention in the form of 20% aqueous solutions from which they may be recovered or in which they may be used as such. Determination of lithium in the resultant reaction mixture can be done quickly by titration with HCl, using Bromthymol Blue as an indicator.

Recovery of the desired lithium salt from the reaction solution as a dry powder can be accomplished, for example, by the seriatim steps of evaporation under vacuum to a small volume, addition of sufficient isopropanol to form a solution at 70° F., and cooling to produce a crop of crystals. This procedure may be repeated on the mother liquor to yield successive crops of crystals. While such evaporation may be performed at atmospheric pressure, it is preferred to use vacuum.

Representative preparations of salts of the invention are the following:

EXAMPLE 1—PREPARATION OF LITHIUM GABA 82.4 grams of GABA were added to 400 ml. of 2 N lithium hydroxide solution. The final solution was clear and colorless and with a pH of 12–12.5. This solution was evaporated under vacuum to a weight of 111 grams. 300 ml. of isopropanol were added and the mixture was heated to 70° F. A clear solution was obtained, which was allowed to cool overnight during which time crystals formed. The resultant crystals were filtered off, washed with isopropanol and dried at 65° F.

The yield was 82.3 grams and the purity, as determined by HCl titration was 93.1%. A second crop of 6.5 grams and a third crop of 1.5 grams were obtained. The total yield was 90.3 grams which was 103.8% of the theoretical yield.

EXAMPLE 2—PREPARATION
OF LITHIUM GABA 322 grams of GABA were added to a solution made by dissolving 129.8 grams of LiOH·1H$_2$O in 1200 ml. of water. The material was stirred until it was all in solution, and then it was filtered and evaporated under vacuum to a total weight of 487 grams. 1500 ml. of isopropanol were added and the solution warmed to 70° F. A slightly hazy solution was obtained. This solution was divided into two equal parts of which one was filtered and the other remained unfiltered.

The unfiltered portion was treated, as in Example 1, to yield four successive crops of crystals totaling 176.6 grams. Infra-red analysis showed a free amino group to be present but no free carboxyl. Purity, as determined by direct titration ranged from 95% for the first crop of crystals to 71.9% for the last crop.

The filtered portion, which had been filtered hot with Darco G60 activated carbon also was treated to yield four successive crops of crystals totaling 166.8 grams.

The purity of the first crop was determined by titration at 89.9%.

The combined yield of both crops was 343.4 grams or 100.5% of theoretical.

EXAMPLE 3—PREPARATION OF LITHIUM GABA 1410 grams of commercial gamma amino butyric acid were washed with methanol and dried. This material was made into a solution using 2,000 ml. of water and 10 grams of Nuchar C–190–N activated carbon. The solution was stirred and filtered. To the filtrate was added 572.5 grams of $LiOH \cdot 1H_2O$. The solution was stirred and evaporated under vacuum to a total weight of 2,218 grams. To this evaporated solution was added 1200 ml. of isopropanol, the material heated to 70° F. and filtered. Thereafter, the filtrate was diluted to 8,000 ml. with isopropanol.

No crystals formed on cooling but, after evacuation under vacuum to a syrup and the addition of 4,000 ml. of isopropanol, crystals were formed. These crystals were filtered off and dried at 65° F. The filtrate was treated in this same manner to yield four more successive crops having the following weight and purity:

| Crop | Weight | Purity |
| --- | --- | --- |
| 1 | 377.1 | 96.7 |
| 2 | 528.3 | 92.1 |
| 3 | 227.6 | 91.4 |
| 4 | 207.3 | 90.0 |
| 5 | 84.0 | 81.2 |
| Total | 1,424.3 | |

EXAMPLE 4—PREPARATION OF LITHIUM GABA 10.3 grams of gamma amino butyric acid and 50 ml. of a 2 N solution of lithium hydroxide were made up to 100 ml.

After it was judged that neutralization was complete, a ten ml. sample of the reaction mixture was withdrawn and titrated with 0.5 N hydrochloric acid using Bromothymol Blue as the indicator. This titration showed that 99.48% of theoretical lithium was present.

The balance of 90 ml. of the reaction solution, equivalent to 9.79 grams of the lithium salt, was evaporated to a constant weight of 13.2 grams on a water bath. At this weight its physical appearance was that of a crystalline mush. Isopropanol was added and evaporation repeated until a solid product was obtained. The weight of solid product was 10.2 grams and its purity was determined at 86.1%.

EXAMPLE 5—PREPARATION OF LITHIUM GABA

Using the same procedures as in Example 4, 20.6 grams of gamma amino butyric acid were reacted with 100 ml. of 2 N lithium hydroxide solution and the volume made up to 200 ml. Titration of a 10 ml. sample, as is in Example 4, showed 100.8% of theoretical lithium to be present.

100 ml. of the reaction mixture, equivalent to 10.894 grams of lithium salt, were evaporated under vacuum to a constant weight. The yield, a waxy solid, weighed 13.5 grams. To this solid, were added 25 ml. of methanol; and the mixture was warmed until the solid went into solution.

Thereafter, evaporation under vacuum yielded a hygroscopic powder weighing 11 grams and having a purity of 98.6%.

EXAMPLE 6—PREPARATION OF LITHIUM GABOB 42 grams of lithium hydroxide monohydrate (1 mole) and 119 grams of gamma amino beta hydroxy butyric acid (1 mole) were mixed in 125 ml. of water and dissolved at room temperature to a cloudy, slightly yellow solution. The solution was filtered with suction through Whatman No. 50 paper and the volume of the clear filtrate was adjusted to 375 ml. This solution was determined to contain 125 grams of the lithium salt of GABOB.

EXAMPLE 7—PREPARATION OF LITHIUM GABOB

The procedure of Example 6 was followed using 11.9 grams (0.1 mole) of GABOB and 50 ml. (0.1 mole) of 2 N lithium hydroxide solution. The reaction mixture was evaporated under vacuum to a syrup, methanol was added and the solution was evaporated to a solid weighing 15.0 grams. Excess toluene was added and evaporated under vacuum to a constant weight. The final material weighed 14 grams.

EXAMPLE 8—PREPARATION OF LITHIUM GABOB

The initial procedures of Example 7 were followed using 11.9 grams of GABOB and 50 ml. of 2 N lithium hydroxide solution. However, instead of evaporation under vacuum this material was freeze-dried. Although dry in the freezing chamber, the product absorbed water when removed from vacuum and became a liquid solution within a few hours. In its liquid form it was found useful on laboratory animals in connection with experiments of the type described below.

The compounds prepared in Examples 7 and 8 were analyzed with determinations being made of carbon, hydrogen and nitrogen. Nitrogen was determined using the Kjeldahl method. The results for both products were the same. Nitrogen—theory, 11.19, actual—11.06; carbon—theory, 38.38, actual—38.93; hydrogen—theory, 6.39, actual—6.44.

In order to verify the utility of the compounds of the invention, various animal experiments were performed. An initial group of experiments was run to determine toxicity.

The toxicity studies were made using a procedure known to those skilled in the art as LD 50. The procedure is described in "Appraisal of the Safety of Chemicals in Foods, Drugs and Cosmetics" by the staff of the Division of Pharmacology, Food and Drug Administration appearing in "Acute Toxicity Studies" by B. Davidow and C. Hogan, pages 685–694. Essentially the procedure involves determination of a dosage necessary to kill 50% of laboratory animals tested. Such a dosage is designated as the LD 50 dosage.

Laboratory rats were tested using lithium chloride as a control, since this material has been used in human lithium therapy. Also tested were Lithium GABA (e.g., the material of Example 2) and Lithium GABOB (e.g., the material of Example 6). The administration was a single oral dose and the following LD 50 values were obtained.

| | Mgm./kilo of body weight |
| --- | --- |
| Lithium chloride | 687 |
| Lithium GABA | 20,000 |
| Lithium GABOB | 1,250 |

Another group of experiments was run using laboratory mice and subcutaneous administration of a single dose. The following LD 50's were obtained:

| | Mgm./kilo of body weight |
| --- | --- |
| Lithium chloride | 1,000 |
| Lithium GABOB | 1,300 |

Utility of the compounds was also determined using laboratory animals (i.e., mice). Psychoses was produced by total sensory deprivation for 10 days. The animals, thereafter, would twitch and have spastic reactions at the slightest sound. Anorexia was also part of the syndrome with the animals biting the food containers rather than eating the contents, thus necessitating force feeding.

A single dose of 500 mg./kilo of body weight of lithium GABA cured 75% of the mice treated—restoring normal eating habits and eliminating their twitches. The same single dose (i.e., 500 mg.) of GABA administered to another group of the animals produced some sedation but no cure of psychoses. The same single dose (i.e., 500 mg.) of lithium carbonate killed 90% of the animals tested.

Having described the invention, what is claimed is:

1. A lithium salt having the formula:

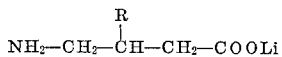

wherein R is selected from the group consisting of hydrogen and hydroxyl.

2. The salt of claim 1 wherein R is hydrogen.
3. The salt of claim 1 wherein R is hydroxyl.

References Cited

Voss et al., Chem. Ab., vol. 24, 5022–23 (1930).
Fugagaw, Chem. Ab., vol. 29, 2916 (1935).
Schou, Chem. Ab., vol. 49, 7750–51 (1955).
Tsindrik et al., Chem. Ab., vol. 52, 19414(e) (1958).
Hayashi et al., Chem. Ab., vol. 53, 1172(d) (1959).
Gallardo, Chem. Ab., vol. 60, 2779(a) (1964).

LORRAINE A. WEINBERNER, Primary Examiner

PAUL J. KILLOS, Assistant Examiner

U.S. Cl. X.R.

260—999